Jan. 17, 1928. 1,656,674
J. J. KELKER
MEANS FOR AND METHOD OF COMPRESSING PISTON RINGS
Filed April 21, 1927   2 Sheets-Sheet 1
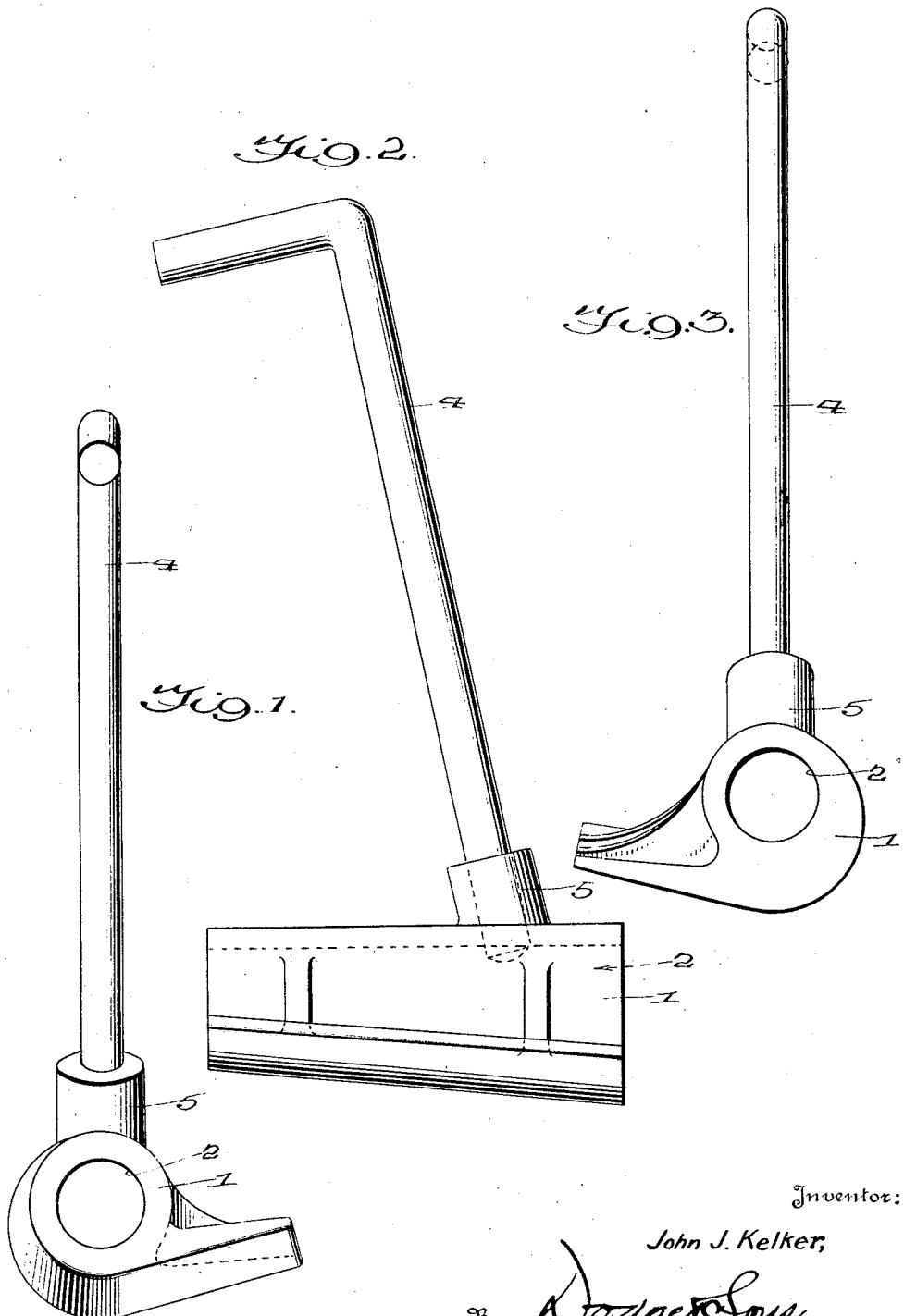
Inventor:
John J. Kelker,
By Dodge Sons,
Attorneys Jan. 17, 1928.  1,656,674
J. J. KELKER
MEANS FOR AND METHOD OF COMPRESSING PISTON RINGS
Filed April 21, 1927    2 Sheets-Sheet 2

Inventor:
John J. Kelker,
By Dodge & Sons,
Attorneys

Patented Jan. 17, 1928.

1,656,674

UNITED STATES PATENT OFFICE.

JOHN J. KELKER, OF POCATELLO, IDAHO.

MEANS FOR AND METHOD OF COMPRESSING PISTON RINGS.

Application filed April 21, 1927. Serial No. 185,600.

This invention pertains to means for, and to a method of, compressing and thereby contracting the encompassing packing rings of a piston, in and by the act of, and for the purpose of facilitating their introduction into, a cylinder. It is more particularly designed for use with large and heavy pistons, though not restricted thereto.

The means employed consists of several simple and identical tools or implements, adapted to be separately placed and arranged in an annular series on the end of the cylinder or its flange, and to be there secured, thus forming in effect a frusto-conical guide, lessening in diameter from its outer to its inner end, where each member extends to a point flush with or slightly past the inner wall or surface of the cylinder. The annular guide so formed readily receives within its larger or outer end, the piston, and its slightly protruding packing rings, guides them into axial alinement with the cylinder, and, by reason of the gradually lessening diameter of the guide, forces the rings radially inward as the piston is pressed or drawn toward and into the cylinder, until they are successively reduced to slightly smaller diameter than the interior of the cylinder, thereby enabling the piston and its rings to enter without difficulty.

Figure 4:
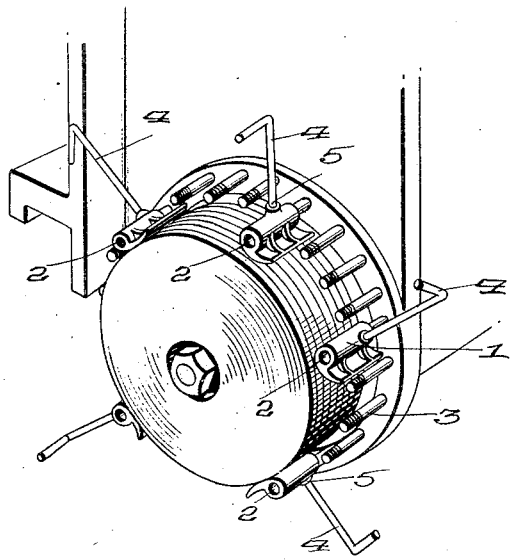
Figure 5:
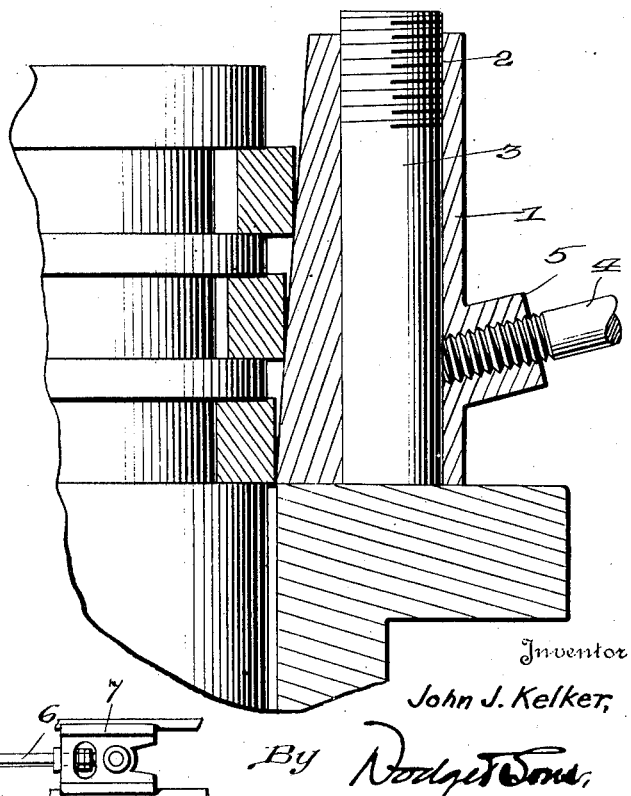
Figure 6:
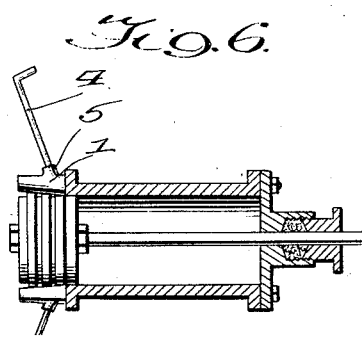

The construction, and the mode of using the device, will be made clear in the following description, aided by the accompanying drawings, in which:

Fig. 1 is an end elevation of one of the tools or implements;

Fig. 2, a side or face elevation thereof;

Fig. 3, an elevation of the tool viewed from the end opposite that seen in Fig. 1;

Fig. 4, a perspective view of a cylinder, and a piston equipped with packing rings and being introduced into the cylinder, guided and aided by a series of the implements properly positioned and secured upon the end or flange of the cylinder;

Fig. 5, a fragmentary sectional view illustrating the manner of compressing the packing rings; and Fig. 6, an elevation, partly in section, illustrating a convenient and preferred way of drawing the piston into the cylinder and compressing the packing rings.

As is well known, pistons for engines, pumps, and like structures, are usually provided with metallic packing rings, cut or severed at one point in their circumference, and having their ends fashioned to overlap in any of the variant forms of scarf joint, but free to move independently or one relatively to the other. The rings are made of external diameter slightly greater than the internal diameter of the cylinder in which they are to be used, and are usually seated in separate circumferential grooves of the piston, though two or more rings are sometimes placed in a single groove with their joints offset. Being larger in diameter than the bore of the cylinder, the rings must be compressed and reduced in diameter to enable them to enter the cylinder, and as they are quite resilient, and in the case of large pistons are usually of somewhat large cross section, considerable force is required to compress them to the extent necessary, and equally at all points.

To handle a large and heavy piston with its rod and rings, position and guide them accurately in axial alinement with the cylinder, and compress the rings so that they shall not at any point project outward beyond the inner wall or surface of the cylinder, requires usually some form of hoist, or a fixed supporting guide, and the services of several workmen, extending over quite a period of time. It is, under existing methods, a somewhat difficult job, and not unfrequently results in injury to hands or fingers. With my equipment the operation is made simple and easy, and can be performed by one workman, expeditiously, safely, and without liability of marring the cylinder, pistons, or packing rings.

The tool or implement in its preferred form comprises a cam-like metal block or guide element 1, provided with an eye or hole 2 to receive within it a bolt, pin or stud 3, which serves as a fulcrum or pivot about which the block may turn or swing, and a handle or lever 4 by which to effect such movement. The handle or lever 4 may conveniently be made of a cylindrical iron or steel rod, threaded at one end to enter a correspondingly tapped hole formed in a boss 5 of the block 1, and is bent laterally at the opposite end to facilitate turning it about its axis to screw the threaded end into or out of the threaded socket. This socket or hole extends entirely through the wall of the block and opens into the eye or hole 2 thereof, so that by turning the rod or lever about its axis its inner end is caused to bear with force against the pivot bolt or stud, and thus to lock the block firmly in adjusted position.

In practice it is usual to secure rigidly in position on the end face or on the flange of a large cylinder such as a locomotive cylinder, an annular series of bolts or studs 3, as seen in Fig. 4, threaded at their outer ends, and designed to receive nuts to hold in place the cylinder head which is provided with a like annular series of holes through which the studs pass as the head is applied to the cylinder. A suitable number, usually three to five, of these studs or bolts, at equal or substantially equal distances apart, are utilized as fulcrums or supporting pivots for a like number of the blocks or guides 1, and about these the several blocks are each swung until a point is reached where the radius of its lower or cylinder-contacting end reaches to or very slightly inward beyond the edge of the inner wall of the cylinder. Each block being in turn adjusted, is securely clamped or made fast against movement either about, or axially of, its pivot bolt or stud 3, by rotating the handle or lever 4 about its axis and setting its threaded end firmly against the pivot bolt or stud, after the manner of a set screw, as above explained.

The piston with its rod 6 secured in place is, if heavy, raised by any suitable means to a level at which its rod can be brought into axial alinement with the cylinder, and the rod is passed into and through the cylinder and through the packing gland at its far end, whereupon force is applied to move the piston to and into the open cylinder end. In practice this force is conveniently applied by coupling or connecting the free end of the piston rod to its cross head 7 carried in the usual guides, as in Fig. 6, and applying force or pressure to said cross head, thus ensuring a straight line axial movement of the rod and of the piston, now alined and guided by the blocks or guide elements 1.

The positioning, adjusting, and locking of the several blocks or guide elements requires but very brief time, and with a light crane, a differential pulley hoist, or the like, the piston can be readily lifted and handled, its rod be passed through the cylinder and its packing gland, and connected with the cross head, and the piston be drawn completely into the cylinder, all in a few minutes, without any considerable physical effort, and with practically no risk of injury to the mechanic or the parts handled or dealt with.

The blocks 1 are preferably made of the form illustrated in the drawing, where it will be seen that each is of cam-like formation, its ends, and the surface connecting them, being of cycloidal form or curvature and of increasing radius as measured from the axis of the eye or hole which receives the pivot bolt or fulcrum. The outer end or that furthest removed from the end of the cylinder when the block is positioned thereon is of shorter radius throughout than is the end which rests upon the cylinder or its flange, and the intermediate surface is hence inclined or oblique to the axis of the eye or pivot hole, and to the axis of the cylinder. This formation causes each block to offer under all adjustments, an inclined supporting face for the piston rings to slide upon, and said surfaces incline equally toward a common center lying in the axis of the cylinder, hence all press and guide the piston rings simultaneously and equally toward said axis, and compress them uniformly from the varying angles which the blocks bear to the cylinder axis, as the piston is moved axially between them toward and into the cylinder. By reason of the cycloidal curvature of the blocks, turning them in proper direction about their pivots carries an edge of increasing radius toward the edge of the bore or inner wall of the cylinder, and thus enables each to be quickly and accurately adjusted to bring such edge flush with or slightly within such wall.

To remove the guide blocks it is necessary only to rotate the handles or levers 4 backwardly to unscrew them and free them from the bolts or studs 3, and lift them therefrom.

The blocks or guide elements 1 may be of any desired alloy or metal, as brass, iron or steel. If of cast iron they may be cast in a chill mold and ground and polished to afford a hard and smooth surface over which the rings will slide without injury to either. If made of steel they may be cast or forged, machined, and finished, and finally tempered.

While the special form described is deemed best, substantially frusto-conical blocks having an eccentrically located eye or pivot hole will give good results.

Where the cylinder is counterbored to an axial depth equal to or greater than the width of the circumferential face of the piston ring or rings a flexible and resilient band of metal, or a series of bearing strips of proper thickness, or width and thickness, may be applied to such counterbore preparatory to introducing the piston, and the guiding blocks or elements will be adjusted to project past the counter bore and to or slightly beyond the inner wall proper, of the cylinder.

If the cylinder be not already equipped with its head-retaining bolts or studs, suitable studs will be temporarily applied and secured thereto, to serve as pivots or fulcrums for the guide blocks or members.

The same set of guide blocks may be used with pistons of widely differing diameter.

I am aware that various contrivances have been proposed for compressing piston rings and facilitating introduction of pistons provided with such rings, but the device here described is found peculiarly efficient, and is believed to offer material advantages over all prior appliances known to me.

What is claimed is:—

1. An implement for use in compressing piston rings, comprising a metallic block having an eye to receive and encompass a pivot bolt or stem, and formed with a peripheral surface of cycloidal form and oblique to the axis of said eye; and a lever for turning said block about its pivot axis, said lever being threaded at one end and extended through a correspondingly tapped hole opening into the eye, and serving when rotated about its axis, to press against the pivot stud and hold the block firmly at any desired angular adjustment about its pivot axis.

2. Guiding and compressing means for use in introducing into a cylinder a piston equipped with circumferential packing rings, said means comprising an annular series of blocks, each having an eye to receive a pivot stud carried by the cylinder, and a guiding face oblique to the axis of said eye and eccentric to said axis; and means for turning each block to bring the circumferential edge of its base into proper relation to the inner wall of the cylinder, and for securely holding the block at such adjustment.

3. An implement of the character described, comprising a metallic block having a circumferential face corresponding to a longitudinal segment of a truncated cone; an eye or opening in said block to receive a pivot stud, the axis of said eye being eccentrically located with reference to the conical face; and a lever for turning said block about its pivot axis, to carry the base of its conical surface to or slightly beyond the inner wall of a cylinder.

4. An implement for use in compressing piston rings, comprising a substantially frusto-conical metallic block having a stud-receiving eye or opening eccentrically located with reference to the frusto-conical face of the block; and a lever for turning said block about the axis of the stud-receiving eye.

5. Means for centering and guiding into its cylinder a piston equipped with circumferential packing rings, said means comprising an annular series of blocks of the character set forth in claim 4, each block provided with means for securing it rigidly upon the cylinder and with the circumferential edge of its base extending to or slightly within the inner circumference of the cylinder; and means for moving the piston axially with reference to the cylinder, to compress and reduce in diameter the packing ring or rings, and finally carry the piston entirely into the cylinder.

6. The herein described method of introducing into an engine cylinder a piston equipped with circumferential packing rings and with a piston rod, said method consisting in securing to the open end of the cylinder an annular series of guide blocks, each having a convex face inclining outward relatively to the cylinder axis and set with its base extending to or slightly within the bore of the cylinder; passing the piston rod of a piston equipped with circumferential packing rings, longitudinally through the cylinder from its block-equipped end to and through the gland at the opposite end; attaching the piston rod to the cross-head of the engine; and applying force to said head, whereby the piston is drawn into and centered by the guide blocks and the rings are compressed to a diameter slightly less than that of the cylinder bore, and continuing said force until the piston is drawn entirely into the cylinder.

In testimony whereof I have signed my name to this specification.

JOHN J. KELKER.